United States Patent Office 3,415,612
Patented Dec. 10, 1968

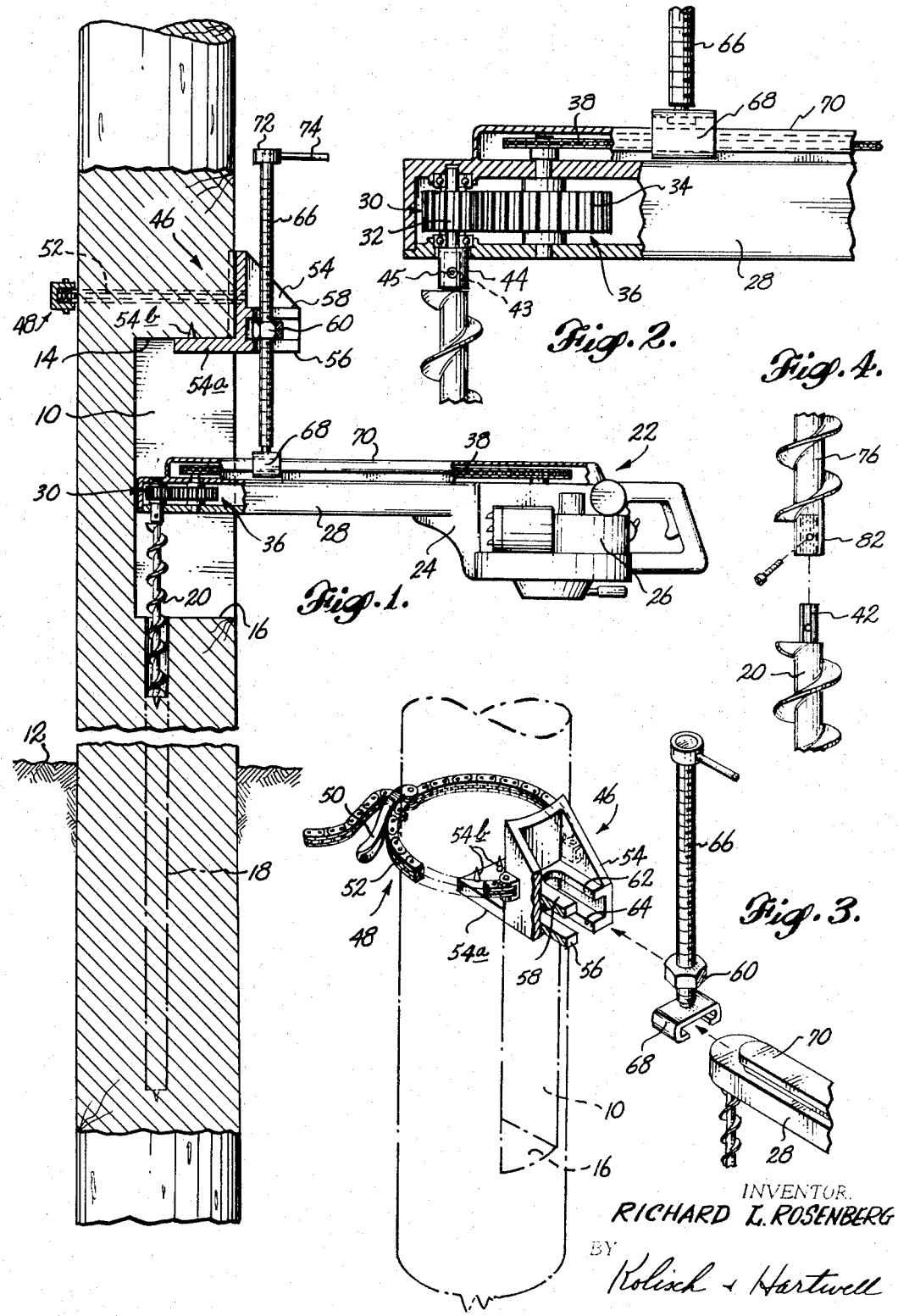

3,415,612
METHOD OF TREATING STANDING POLES AND THE LIKE
Richard L. Rosenberg, 2855 SW. Rutland Terrace, Portland, Oreg. 97201
Filed Apr. 1, 1966, Ser. No. 539,451
7 Claims. (Cl. 21—7)

ABSTRACT OF THE DISCLOSURE

This invention relates to the treatment of standing poles with a preservative material, whereby the service life of the pole may be increased.

---

Poles, such as telephone poles, electric utility poles, pilings, posts, etc., are commonly sunk in the ground with their butt or bottom ends extending some distance below the level of the ground. The usual wooden pole over a period of time deteriorates as the result of fungicidal decay, termite damage, etc. That region of a pole which is most susceptible to such damage comprises the heartwood, which in a tree extends along the trunk within an encompassing sheath of so-called sapwood. In the case of a standing pole, such as a utility pole, greatest deterioration usually occurs adjacent the ground. The heartwood exhibits less natural resistance to decay then does sapwood, and in the case of a standing pole, moisture and temperature conditions directly adjacent the ground line are such as to promote rot and decay.

Various procedures have been proposed for lengthening the service lift of a wooden pole. In general, such procedures have relied upon the impregnation of the pole with some form of preservative material, such as cresote or pentachlorophenol. An important part of such treatment comprises the provision of some means promoting penetration of the pole whereby the preservative is enabled to travel into the center heartwood portions of the pole. Most procedures known to applicant are unsuitable for use with standing poles, as they require either a special pressure treatment, or a process for opening up a pole, such as an incising process, which as a practical matter can only be carried out prior to a pole's being set in the ground. This invention, therefore, contemplates, as a principal object thereof, the provision of a novel method for treating a pole whereby the same may be impregnated with preservative, which is particularly suited for the large number of poles now in use that are already standing and that have not previously been treated with preservative, or if treated have been treated only superficially without proper penetration of the heartwood region.

Another obejct of this invention is the provision of a novel method for treating a standing pole, which is effective to introduce preservative to the heartwood in an elongated zone which generally substantially parallels the pole's grain. With the invention, a zone may be selected for treatment which coincides with the region in a pole which is most susceptible to rot and decay. Thus, with a utility pole, the zone selected for treatment would comprise a zone extending through the ground line.

More specifically describing an embodiment of the present invention, in treating a standing pole an initial step comprises preparing a cavity which extends inwardly from a side of the pole at a point located above the ground, which cavity is of large enough size as to enable a drilling bit section to be placed at the center of the pole in a position substantially paralleling the grain. This drilling bit section is then rotated so as to drill out a bore, with the section advancing downwardly along the pole center. If desired, another bit section may be placed on top of the first introduced section, attached to said first introduced section, and drilling of the bore continued along another expanse of the pole. After completion of the drilling, the bit sections are removed, and the empty bore filled with preservative. Finally, the cavity made to receive the bit sections is suitably plugged. With the bore described extending generally parallel to the grain in the pole, there is minimum weakening of the pole. Extending as it does along the center of the pole through the heartwood region there is maximum exposure of preservative to the center heartwood region. The plug which is fitted into the cavity preferably is bonded in place, with the bonded plug thus closing off the cavity and also being effective to restore strength to the region where the cavity is located. Bonding of the plug also minimizes the possibility of water leaking into the cavity and bore.

These and other objects and advantages are attained by the invention, and the same is described hereinbelow in conjunction with the accompanying drawings, wherein:

FIG. 1 illustrates portions of a standing pole, shown partly in cross section, and apparatus such as might be employed in carrying out one embodiment of the invention, including a drilling bit section and motor operated unit for advancing the same along the heartwood region of the pole;

FIG. 2 is an enlarged view of portions of the drilling bit section and the mechanism provided for rotating the same under power;

FIG. 3 is a perspective view illustrating how the motor-operated unit that drives a bit may be anchored on the pole; and FIG. 4 is an exploded view of portions of two bit sections, showing how such may be detachably connected together.

As generally indicated above, this invention contemplates the preparation of an elongated bore extending downwardly parallel to the pole's grain in the heartwood of a pole, which bore may be used to receive a preservative, such as creosote or pentachlorophenol. With such a bore there is minimum cross grain cutting in the pole, and for a given length of bore the greatest possible expanse of the heartwood is exposed to the preservative.

The pole is first prepared by extending a cavity laterally inwardly from a side of the pole, in a region located above the ground line. In FIG. 1 this cavity is shown at 10, the ground line for the pole is shown at 12. The cavity may be prepared using a conventional router, and it will be noted that it extends into the pole a sufficient distance to expose the center thereof. The cavity is defined along the top and bottom preferably by walls that are either substantially horizontal, or that slope downwardly slightly progressing outwardly on the pole, whereby the flow of any leakage water to the center of the pole is inhibited. In the drawing, such walls are shown at 14 and 16.

After preparing such cavity, a bore is prepared, such as the one shown at 18, which extends downwardly along the pole center and parallels the grain of the wood. In drilling this bore, bit section 20 may be used, which has a length somewhat less than the length of cavity 10. This enables the bit section to be placed in a perpendicular position, or a position paralleling the pole's grain, prior to the start of the drilling, with the bit located over the pole center.

The bit is rotated for drilling purposes using a power-operated drive unit, such as the one shown at 22. Unit 22 includes a frame 24 mounting a motor, such as internal combustion motor 26. Frame 24 includes an elongated arm 28 rotatably mounting at the forward extremity thereof a driving head 30. Teeth 32 on the outside of the driving head mesh with teeth 34 of a drive gear 36, which is journaled on arm 28 somewhat inwardly of driving head 30. Drive is transmitted from motor 26 to gear 36 through a chain 38. The motor unit includes a reversing transmission, whereby gear 36 may be rotated in either of opposite directions.

Bit section 20, which in the embodiment of the invention illustrated has an auger type cutter, is provided at the upper end thereof with an externally splined portion (see FIG. 4). This portion of the bit is adapted to be received within an internally splined socket portion 44 of drive head 30. A screw 45 (see FIG. 2) extending through an accommodating bore in socket portion 44 and screwed into an internally threaded bore 43 in portion 42 (see FIG. 4) may be provided to secure the parts together. With the upper end of the bit section received within the socket portion described, on operation of motor 26 the bit section is rotated under power, the direction of rotation depending upon the direction in which gear 36 is rotated.

The apparatus illustrated further comprises a drive unit mounting assembly 46, which may be utilized to stabilize the drive unit during the boring operation, and to force the drive unit downwardly thus to promote cutting by the bit section.

Describing this assembly in more detail, a clamp 48 is provided including a chain 52, tightenably about a pole by a clamp handle 50. Mounted on a portion of this chain is a retaining bracket 54. The bracket includes a plate portion 54a which fits against wall 14, thus to hold the retaining bracket from shifting axially upwardly along the pole. Teeth 54b of the retaining bracket function further to anchor the bracket against movement. The retaining bracket also includes flanges 56, 58 defining a channel for the reception of a nut 60, which flanges are slotted at 62, 64.

Nut 60 is screwed onto a threaded shaft 66. The channel described is adapted to receive the nut while holding the nut from rotation. The slots described are provided for receiving the threaded shaft when the nut is slipped into the channel.

Journaled on the base of shaft 66 is a saddle 68. This saddle may be assembled with the power drive unit by sliding it over one end of a rail 70 of T-shaped cross section which extends along the top of arm 28. When mounted on the rail, as shown in FIG. 1, the forward portion of the power-operated drive unit in effect is anchored by the mounting assembly 46.

Mounted on the top of threaded shaft 66 is a ratchet assembly 72 operated by handle 74. The assembly is adjustable, and may be utilized in one position of adjustment to turn the threaded shaft in increments to advance the lower end of the threaded shaft downwardly, and in another position of adjustment to turn the shaft in increments so as to raise the lower end of the shaft.

In practicing this invention, after the preparation of cavity 10, bit section 20 is placed in the cavity substantially at the center of the pole in an upright position. The power-operated drive unit is connected to the bit section by inserting the splined portion 42 of the bit section into splined socket portion 44 described. The drive unit mounting assembly may be mounted in place, and the base of the threaded shaft anchored to the top of the assembly through rail 70. The motor may then be operated to rotate the bit section whereby it is caused to move downwardly into the heartwood. By turning threaded shaft 66 as drilling progresses, a downward force may be exerted on the bit section through a leverage applied against top wall 14 of the cavity.

If the length of the bore desired in the pole does not exceed the length of the bit section 20, after the bit section has been advanced the distance required to produce the length of bore desired, the bit section is removed by rotating it in the opposite direction whereby it tends to back out of the bore. With removal of the bit section, the bore produced may be filled with preservative material, which material then forms a column extending along the center of the pole. Cavity 10 may then be closed with an agency such as plug shaped exactly to fit the cavity. Preferably, the sides of the plug are sealed to the boundaries of the cavity, in regions located laterally outwardly of the upper end of the bore, for the purpose of inhibiting water leakage into the bore and to produce an integral construction adding strength to the pole where the cavity is located.

In some instances it may be desirable to practice this invention by preparing a bore which exceeds in length the length of cavity 10. In this instance, a drilling bit may be employed comprising multiple bit sections, each of which has a length somewhat less than the length of cavity 10.

Referring to FIG. 4, here a bit section 76 is shown which includes at the base thereof an internally splined socket portion 82. This socket portion is shaped to fit over the splined portion 42 of bit section 20. There may also be provided a screw, similar to screw 45, for further securing the bit sections together. The upper extremity of bit section 76 may be constructed similarly to the upper end of bit section 20 already described.

With such an assembly, the bore is initially prepared using only bit section 20. After this bit section has advanced downwardly to such an extent as to place the upper end thereof directly adjacent the base of cavity 10, the drive unit is removed and bit section 76 placed on top of bit section 20. After securing the two bit sections together, the power-operated drive unit may then be attached to the top of bit section 76, and drilling resumed, with further advancement of the bit assembly downwardly in the heartwood. After completion of the drilling operation, the various bit sections are removed as they become fully exposed in cavity 10 on being retracted upwardly from the bore.

It should be apparent that the method of the invention is applicable to a wide variety of standing poles, be they utility poles, pilings, posts, etc. A pole after treatment is fully exposed in the heartwood region to the preservative carried in the bore. The exposure to this preservative is along an elongated expanse which substantially parallels the grain or longitudinal axis of the pole. After treatment and with the plug filling cavity 10, the pole has substantially the strength of the original pole. Further, with the plug in place the top of the bore is effectively sealed from the elements.

While various modifications of the invention have been described, it is obvious that variations are possible without departing from the invention, and it is desired to cover all forms of the invention as would be apparent to one skilled in the art, and that come within the scope of the appended claims.

It is claimed and desired to secure by Letters Patent:

1. A method of treating with preservative a standing wooden pole, which pole has an end sunk into the ground, the method comprising:
   from a side of the pole preparing a laterally inwardly extending cavity extending into the pole in a region located above the ground, which cavity embraces substantially the center of the pole,
   from a point inside said cavity adjacent the center of the pole preparing a bore extending downwardly in the pole, which bore parallels the grain in the pole, introducing preservative into said bore, and
   with a plugging agency then closing off said cavity.

2. The method of claim 1, wherein a base is prepared for said cavity, which base extends at such an angle relative to the pole's longitudinal axis as to inhibit the leakage of water from the outside of the pole into the top of said bore.

3. The method of claim 1, wherein the bore is prepared using a drilling bit section, and the cavity is prepared to have a dimension in a direction paralleling the pole's grain of greater length than the bit section, and the bit section is placed in a position paralleling the pole's grain prior to preparing the bore with such positioning accommodated by the dimension prepared in said cavity.

4. The method of claim 1, wherein the bore is prepared using a drilling bit assembly comprising multiple separable bit sections, the cavity is shaped to have a dimension in a direction paralleling the pole's grain which is greater than the length of any of the bit sections, each bit section is placed in a position paralleling the pole's grain prior to the same being advanced to produce a bore, such positioning being accommodated by the dimension prepared in said cavity, and after a bit section is advanced downwardly in said bore to place the top thereof adjacent the base of said cavity a following bit section is fastened to the top of the one just so advanced.

5. The method of claim 1, wherein the bore is prepared using a drilling bit section, the cavity is prepared to have a dimension in a direction paralleling the pole's grain of greater length than the bit section, and the bit section is placed in a position paralleling the pole's grain prior to preparing the bore, with such positioning accommodated by the dimension prepared in said cavity, and the bit section is forced downwardly in said pole while the bore is prepared through leverage applied against a wall bounding the top of said cavity.

6. The method of claim 1, wherein the cavity is closed off with sealing of the plugging agency to the boundaries of the cavity in a region located laterally outwardly of the upper end of said bore.

7. The method of claim 6, wherein a base is prepared for said cavity, which extends at such an angle relative to the pole's longitudinal axis as to inhibit the leakage of water from the outside of the pole into said bore.

References Cited

UNITED STATES PATENTS

| | | | |
|---|---|---|---|
| 1,369,539 | 2/1921 | Pfeiffer | 21—73 |
| 1,982,975 | 12/1934 | Aiken | 21—73 |
| 3,360,601 | 12/1967 | Rosenberg | 52—517 |

MORRIS O. WOLK, *Primary Examiner.*

F. T. RUDIAK, *Assistant Examiner.*

U.S. Cl. X.R.

21—62, 63, 73; 43—18; 47—8; 52—517; 61—53, 54; 117—58; 144—327